(12) United States Patent
Nowak

(10) Patent No.: US 10,585,413 B2
(45) Date of Patent: Mar. 10, 2020

(54) ASSEMBLY WORKSTATION COMPRISING POSITION DETERMINATION DEVICE

(71) Applicant: Robert Bosch GmbH, Stuttgart (DE)

(72) Inventor: Rene Nowak, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 15/488,940

(22) Filed: Apr. 17, 2017

(65) Prior Publication Data
US 2017/0300032 A1    Oct. 19, 2017

(30) Foreign Application Priority Data
Apr. 19, 2016    (DE) .................... 10 2016 206 529

(51) Int. Cl.
*G05B 19/402* (2006.01)
(52) U.S. Cl.
CPC .. *G05B 19/402* (2013.01); *G05B 2219/42338* (2013.01)
(58) Field of Classification Search
None
See application file for complete search history.

(56) References Cited

U.S. PATENT DOCUMENTS

| 6,198,485 | B1 | 3/2001 | Mack et al. |
| 7,175,034 | B2* | 2/2007 | Nook .................... A47F 5/0018 211/189 |
| 7,227,526 | B2 | 6/2007 | Hildreth et al. |
| 8,061,539 | B2* | 11/2011 | Punzel .................. A47B 57/10 108/108 |
| 9,477,888 | B1* | 10/2016 | Lewis ..................... G06F 1/163 |
| 9,723,248 | B1* | 8/2017 | Colburn ............... H04N 5/7458 |
| 2003/0051415 | A1* | 3/2003 | Remelts ................ A47B 21/00 52/36.1 |

(Continued)

FOREIGN PATENT DOCUMENTS

DE          103 20 557 A1    12/2004
DE    20 2011 106 404 U1     1/2012
(Continued)

OTHER PUBLICATIONS

DE 102013220107 A1 translation (Year: 2015).*

*Primary Examiner* — Lina M Cordero
(74) *Attorney, Agent, or Firm* — Maginot, Moore & Beck LLP

(57) ABSTRACT

A method for configuring an assembly workstation, the assembly workstation having container receptacle devices configured to receive an associated material container, each container receptacle device having a first data carrier, the material containers having a second data carrier, the assembly workstation having a first position determination device configured to ascertain one of (i) a position of a hand of a worker and (ii) a marking connectable to the hand, the first position determination device being connected to a control device, the method comprising: capturing a reference position corresponding to a reference point on a container receptacle device that is touched by the hand of the worker; reading out first data from the first data carrier associated with the reference point; reading out second data from the second data carrier associated with the reference point; and storing the reference position, the first data, and the second data.

11 Claims, 2 Drawing Sheets

(56) References Cited

U.S. PATENT DOCUMENTS

| | | | |
|---|---|---|---|
| 2008/0121168 A1 | 5/2008 | Ryznar et al. | |
| 2009/0228841 A1 | 9/2009 | Hildreth | |
| 2012/0062725 A1* | 3/2012 | Wampler, II | G01V 8/12 348/86 |
| 2012/0158235 A1* | 6/2012 | Jaynes | B25J 9/1656 701/25 |
| 2013/0325155 A1* | 12/2013 | Ryznar | G05B 19/418 700/95 |
| 2014/0225824 A1* | 8/2014 | Shpunt | G06F 3/0488 345/156 |
| 2014/0285690 A1* | 9/2014 | Benedetti | G06T 3/00 348/241 |
| 2018/0027218 A1* | 1/2018 | Kiso | H04N 9/3179 705/7.14 |

FOREIGN PATENT DOCUMENTS

| | | |
|---|---|---|
| DE | 10 2010 034 151 A1 | 2/2012 |
| DE | 10 2013 220 107 A1 | 4/2015 |
| EP | 1 645 921 A1 | 12/2006 |
| EP | 2 052 807 A1 | 4/2009 |
| EP | 2 716 578 A1 | 4/2014 |

\* cited by examiner

ASSEMBLY WORKSTATION COMPRISING POSITION DETERMINATION DEVICE

This application claims priority under 35 U.S.C. § 119 to application no. DE 10 2016 206 529.7, filed on Apr. 19, 2016 in Germany, the disclosure of which is incorporated herein by reference in its entirety.

BACKGROUND

The invention relates to a method for configuring an assembly workstation, a corresponding assembly workstation, and a method for operating this assembly workstation.

An assembly workstation of the type in question has multiple container receptacle devices, which are each designed to receive at least one associated material container, wherein a first position determination device is provided, using which the position of a hand of a worker or a marking connectable to said hand is ascertainable, wherein the first position determination device is connected to a control device. A corresponding assembly workstation is known from DE 10 2013 220 107 A1.

SUMMARY

One advantage of the present invention is that the commissioning of the assembly workstation is particularly simple, intuitive, and time-saving.

According to claim 1, a method for configuring the assembly workstation of the type in question is proposed, wherein multiple container receptacle devices are provided with a first data carrier, wherein multiple material containers are provided with a second data carrier, wherein the method comprises the following steps, which are executed in any arbitrary sequence:
a) touching a reference point on a container receptacle device using the hand of the worker and capturing a corresponding reference position using the first position determination device;
b) reading out first data from the first data carrier associated with the reference point; and
c) reading out second data from the second data carrier associated with the reference point;
wherein the reference position, the first data, and the second data are stored.

Preferably, all container receptacle devices are provided with a first data carrier, wherein all material containers are provided with a second data carrier. At least one corresponding material container is preferably received in each case in at least a part of the container receptacle devices. The first and/or the second data carrier can be, for example, a barcode, a QR code, an RFID tag, or an NFC tag. The assembly workstation preferably comprises a read device, using which the first and/or the second data carriers can be read out and which is connectable in a wired or wireless manner to the control device. In addition to the first position determination device, a separate second position determination device can be provided, using which, for example, the position of an electrically driven handheld screwdriver or another tool can be determined. The first and/or the second position determination device can be designed, for example, according to US 2009/228841 A1 or DE 10 2010 034 151 A1 or U.S. Pat. No. 6,198,485 B1. Preferably, different position determination methods are used in the first and the second position determination devices. The reference position, the first data, and the second data are preferably stored in the control device.

Advantageous refinements and improvements of the invention are indicated in the dependent claims.

It can be provided that the method is carried out for all container receptacle devices, in which at least one material container is received. Therefore, no material containers remain, for which a complex further configuration procedure has to be carried out.

It can be provided that the reference position, the first data, and the second data are stored in a common data set such that they are analyzable together. In this case, this primarily relates to carrying out the method according to claim 10 and/or 11. The spatial and/or three-dimensional extension of the relevant material containers or the relevant projection surface is preferably ascertained in this case, very preferably using the associated reference position and the associated first and second data. Further data, which are independent of the present configuration or setting of the assembly workstation, can be used in the determination of the mentioned spatial extensions. For example, a table can be used, in which the dimensions thereof are stored for every available type of material container. Furthermore, a table can be used in which, for every available type of individual part, the container type in which it is kept is stored.

In addition, protection is claimed for an assembly workstation according to claim 4, in which the control device is configured for executing a method according to the invention.

It can be provided that at least a part of the container receptacle devices each have a first and a second container runway, which are arranged in parallel to one another, wherein the spacing thereof is adjustable, wherein an item of information is stored in the first and/or the second data carrier, from which the spacing between the first and the second container runway is derivable. The spacing of the container runways is preferably set matching with the respective associated type of material container. The second data carrier preferably contains an item of information about the type of the associated material container. Most preferably, the control device can access a table, in which the required spacing of the container runways for each available type of material container is stored. The mentioned table can be stored directly in the control device. However, it can also be retrievable from a further computer via a network connection. The second data carrier preferably contains an item of information about the individual parts received in the material container. The first and the second container runways are preferably each a roller conveyor having a plurality of rotatable rollers, on which the material containers run. However, it is also conceivable that the container runways have sliding surfaces for the material containers. In addition to the container runways, flat material planes are also possible. In this case, the box positions on the plane are fixed. Furthermore, it is also possible on the material planes that the material containers are freely positioned and are recognized via the first and/or the second position determination device and are therefore continuously tracked.

It can be provided that all container runways are arranged in parallel to a vertical reference plane. In this way, a grasping movement which is particularly ergonomically advantageous for the worker results, when he reaches into one of the material containers. The assembly workstation is preferably configured to be set up on a horizontal supporting surface, i.e., on a substantially flat supporting surface which is aligned perpendicularly in relation to the direction of gravity. The mentioned reference plane is accordingly aligned in parallel to the direction of gravity.

At least one image projection device can be provided, wherein a projection surface for an image of the image projection device is arranged on an end face, which faces toward the worker, of the first container runway. The image projection device is preferably digitally controllable, wherein it operates, for example, according to the LCD, DLP, or laser principle. Preferably, power-saving and long-lived LEDs are used as the light source. The image projection device is preferably arranged and designed so that it can project an image on all mentioned projection surfaces. However, it is also conceivable that multiple image projection devices are used, in particular if the assembly workstation has many container receptacle devices. The projection surface is preferably formed by a sheet-metal component, which is bent at an angle. The projection surface is preferably provided with a reflective surface. The projection surface is preferably detachably fastened on the first container runway.

It can be provided that the first data carrier is arranged on an end face, which faces toward the worker, of the second container runway. In this way, the worker can read out the first data carrier particularly easily by means of the read device.

At least one tool can be provided, wherein a second position determination device is provided, using which the location and/or the rotational orientation of the tool is ascertainable, wherein the first and the second position determination devices are designed differently from one another. In particular, this is intended to mean that the first and the second position determination devices operate according to different position determination methods. Specifically, this is intended to mean that the first position determination device operates optically, without the hand of the worker being provided with a marking. The second position determination device preferably uses a method which uses special markings on the tool. The rotational orientation of the tool in space is very preferably determinable using the second position device.

Protection is furthermore claimed for a method for operating an assembly workstation according to the invention, wherein it is ascertained, using the first position determination device and the stored reference position and the stored first and second data, whether the worker has reached with his hand into the associated material container or not. An error message visible to the worker is preferably displayed if he reaches into the wrong material container. An assembly instruction is preferably displayed on a display screen of the assembly workstation, wherein the next assembly step is displayed when the worker has reached into the correct material container. The automatic display of the next assembly step very preferably occurs exclusively when the worker has reached into the correct material container.

Protection is furthermore claimed for a method for operating an assembly workstation according to the invention, wherein a predefined image is projected onto an associated projection surface by means of the at least one image projection device, wherein, using the stored reference position, which is associated with the projection surface, and the first and second data, a distorted image, which is transmitted to the image projection device, is ascertained proceeding from the predefined image. The distorted image is preferably designed so that the predefined image is visible to the worker on the projection surface, wherein in particular distortions are compensated for, which arise due to an inclined arrangement of the projection surface in relation to the projection axis of the image projection device. Furthermore, in the case of the mentioned distortion, the circumstance is taken into consideration that the projection surface is substantially smaller than the overall image which the image projection device can project. The predefined image preferably contains an item of information about the number of parts to be taken from the associated material container by the worker, very preferably in the form of an imaged number.

Protection is additionally claimed for an assembly workstation, wherein the control device is configured to execute one of the two above methods.

It is apparent that the above-mentioned features and the features still to be explained hereafter are usable not only in the respective specified combination, but rather also in other combinations or alone, without leaving the scope of the present invention.

BRIEF DESCRIPTION OF THE DRAWINGS

The invention will be explained in greater detail hereafter on the basis of the appended drawings. In the figures.

DETAILED DESCRIPTION

Figure 1:
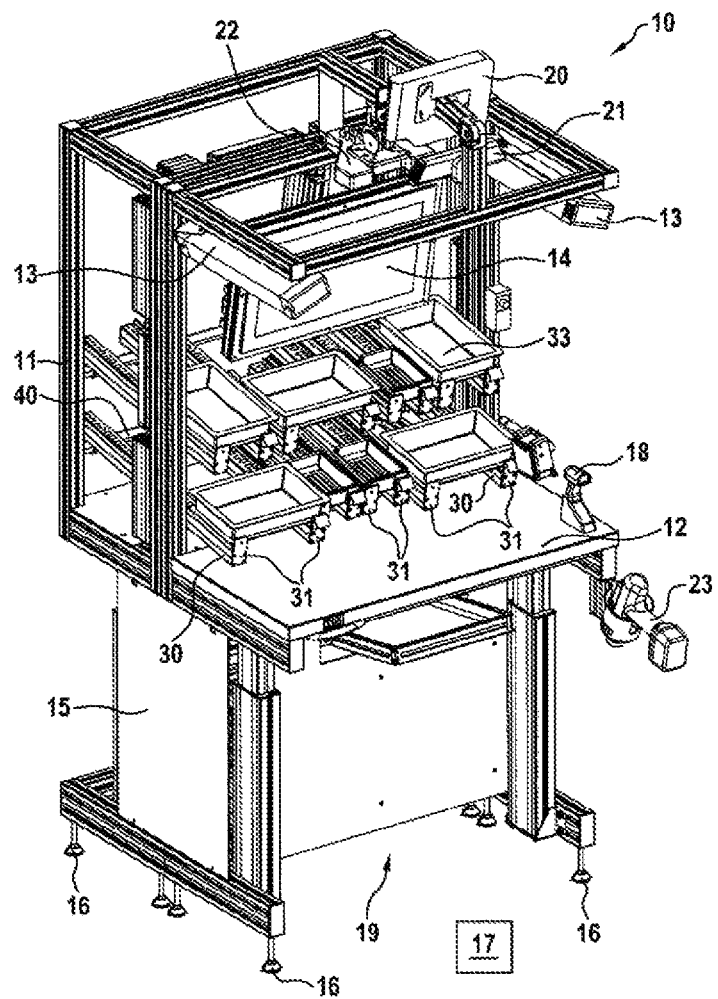
FIG. 1 shows a perspective illustration of an assembly workstation according to the invention.

FIG. 1 shows a perspective illustration of an assembly workstation 10 according to the invention. In the scope of mass production, assemblies are to be assembled from individual parts on the assembly workstation 10, specifically by one worker by hand. The assembly workstation is also usable for the individual manufacturing of assemblies because of its easy convertibility, however. The individual parts are provided in material containers 33, which are received in container receptacle devices 30. The container receptacle devices 30 are fastened on holding profiles 40 such that the position and/or the width thereof are settable, so that an optimum arrangement of the material containers with regard to ergonomics can be selected. The holding profiles 40 are in turn fastened on a framework 11, which is assembled from aluminum extruded profiles in the present case. In addition, a work surface 12 is arranged on the framework 11, which is formed in the present case by a flat plate having constant thickness. The above-mentioned assembly is assembled on the work surface 12. Auxiliary devices can be arranged on the work surface 12, in which the assembly is received. The vertical location of the work surface 12 is adjustable. The framework 12 is provided with multiple vertically adjustable positioning feet 16, so that it can be set up on a preferably horizontal supporting surface.

A display screen 14, which is connected to a control device 17, is arranged above the work surface 12. The control device 17 (which is shown very schematically) can be a single device or multiple partial devices which are networked with one another. The work steps which the worker is to execute are displayed, for example, on the display screen 14. Furthermore, an image projection device 20 is arranged above the work surface 12, which is preferably digitally controllable, wherein it preferably operates according to the LCD, DLP, or laser principle. Power-saving and long-lived LEDs are preferably used as the light source. The image projection device 20 is also connected to the control device 17. Using the image projection device 20, an image is projected onto the material container, from which an individual part is to be taken in the scope of the upcoming assembly step. The container receptacle devices 30 are each provided with a projection surface for this purpose (number 46 in FIG. 2). Said image can contain a number, which indicates the number of parts to be taken. For example, it can have a green background, which signals to the worker that he is to reach into this material container. The colored background can be executed as pulsing between "full intensity" and "off", so that the attention of the worker is more strongly drawn to the correct position. For example, an image having a red background can be projected onto the projection surfaces of the material containers from which no part is to be taken. Depending on the number and arrangements of the container receptacle devices 30, multiple image projection devices 20 are necessary to illuminate all projection surfaces.

The framework 11 is provided with lights 13, using which the work surface 12 can be illuminated brightly, so that the worker can work without fatigue. The image projection device 20 can also be used in this context for the purpose of illuminating individual regions of the workspace more brightly, for example, the region in which the assembly to be assembled is arranged. Furthermore, the image projection device 20 can be used to illuminate the point of the assembly to be assembled at which the next individual part is to be installed. It is also conceivable that the image projection device 20 completely replaces the lights 13.

The image projection device 20 typically has a single image specification in its interior, which is projected and which is formed, for example, by a DLP chip or an LCD chip. This one image specification contains, in possibly distorted form, all images which are to be projected onto the projection surfaces. To calculate the image specification, it is necessary to know the arrangement of the projection surfaces in space. One advantage of the invention is that these positions can be ascertained particularly simply after the mechanical setting of the assembly workstation to a new assembly process.

Figure 2:
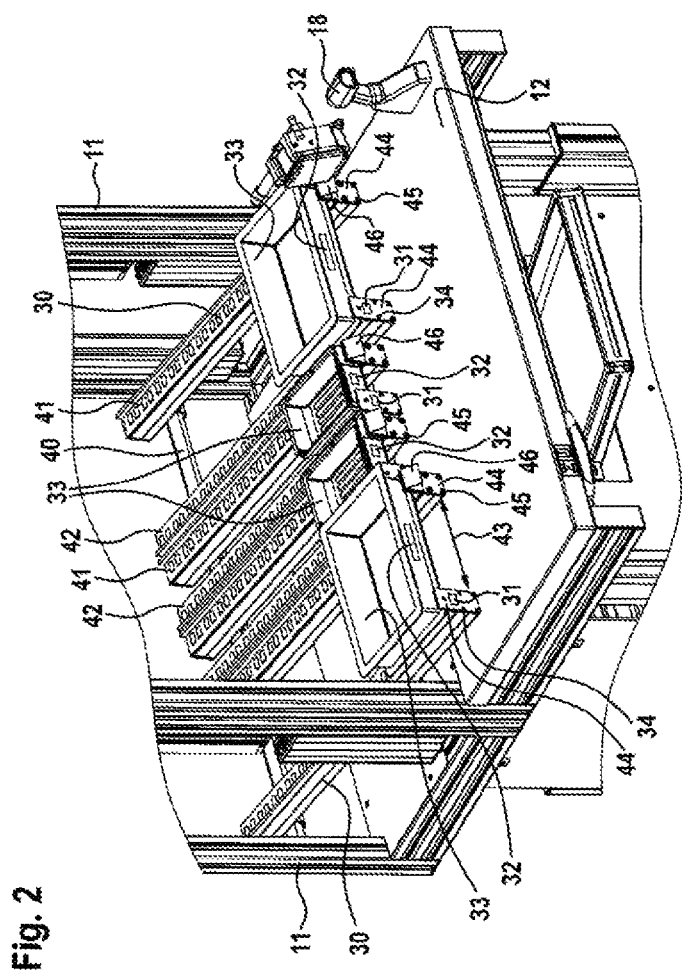
FIG. 2 shows a perspective illustration of the container receptacle devices with the associated material containers.

For this purpose, the container receptacle devices 30 are each provided with a first data carrier 31, wherein the material containers are each provided with a second data carrier (number 32 in FIG. 2). The first and/or the second data carrier can be, for example, a barcode, a QR code, an RFID tag, or an NFC tag. The assembly workstation 10 comprises at least one read device 18, using which the first and the second data carriers 31; 32 can be read out. The read device 18 is connectable or connected in a wired or wireless manner to the control device 17. The first data carrier 31 contains, in the simplest case, a unique first identification number for the respective assigned container receptacle device 30. The second data carrier contains, in the simplest case, a unique second identification number of the part type received in the associated material container. Preferably, only a single type of individual parts is received in one material container. Furthermore, in said simplest case, the second data carrier contains a unique second identification number of the structural type of the associated material container. It is to be noted in this case that typically material containers of different sizes are used for individual parts of different sizes, wherein only a limited number of types of material containers are used within one factory. The container receptacle devices 30 are preferably designed as adjustable, so that they are adaptable to different types, in particular to different structural sizes, of material containers. A corresponding adjustment has an influence on the position of the projection surface and on the position at which the worker typically reaches into the material container.

A first and optionally a second position recognition device is arranged above the work surface. On the one hand, the spatial location of one or both hands of the worker is to be captured thereby. In the simplest case, in each case only the position of a reference point of the respective hand is captured. However, it is also conceivable to capture the rotational orientation of the relevant hand. Furthermore, the position of a tool 23, in particular an electrically driven handheld screwdriver, is to be ascertained using the second position recognition device 22. The position recognition can be performed in different ways, for example, the hand and/or the tool 23 can be provided with one or more ultrasonic emitters, which emit suitable sound signals. The corresponding, in the present case the second, position capture device 22 measures the time which said sound signals require to reach multiple, preferably three ultrasonic receivers. The position of the ultrasonic emitters can be calculated therefrom. If the tool is provided in particular with multiple ultrasonic emitters, which are situated fixed in place in relation to one another, the rotational orientation of the tool in space can additionally be ascertained. This is also true for the hand of the worker.

Furthermore, the first and/or the second position recognition device can operate optically, for example, like a stereo camera, as is known from U.S. Pat. No. 6,198,485 B1 or U.S. Pat. No. 7,227,526 B1. The position recognition can be further improved by using a so-called depth camera, as known, for example, from US 2009/228841 A1. It is also possible in this case to recognize the position of the hand of the worker, without it having to be provided with a marking. The optical position recognition is more accurate and reliable if the relevant object is provided with one or more strongly reflective markings.

It is to be noted that preferably all container receptacle devices 30 are aligned in parallel to a vertical reference plane 15. The reference plane 15 is aligned in particular in parallel to the direction of gravity. It is typically coincident with a side wall of the framework 11, as shown in FIG. 1. Due to the mentioned alignment of the container receptacle devices 30, ergonomically favorable grasping movements result for the worker, when he reaches into a material container.

FIG. 2 shows a perspective illustration of the container receptacle devices 30 with the associated material containers 33. The container receptacle devices 30 each comprise a first and a second container runway 41, 42, which are arranged in parallel to one another, wherein the spacing 43 thereof is adjustable. The container runways 41; 42 are arranged inclined such that material containers 33 placed thereon move into the frontmost position, facing toward the worker, due to the effect of gravity. The two container runways 41; 42 are each provided there with an end stop 44, which is formed in the form of a flat plate having constant thickness, for example. The first container runway 41 is by definition the container runway on which the projection surface 46 is attached. The inclination of the projection surface is selected so that it is well visible to the worker, wherein it is simultaneously ensured that an image can be projected on the projection surface 46 by the image projection device (number 20 in FIG. 1). The projection surface 46 is preferably formed by a sheet-metal component, which is bent at an angle. The projection surface 46 is preferably provided with a reflective surface. The projection surface is preferably detachably fastened on the first container runway 41. The second container runway 42 is by definition the roller conveyor on which the first data carrier 31 is attached. It is preferably fastened on the relevant end stop on the side facing toward the worker.

During the configuration of the assembly workstation, a configuration program is started, which is stored in the control device and executed therein. After a corresponding prompt, which is displayed on the display screen, for example, the worker touches a reference point 34 on a container receptacle device 30 with his hand, wherein the first position determination device captures a corresponding reference position. It is conceivable that the image projection device exclusively illuminates the region of the assembly workstation in which the configuration procedure is presently to be performed. The reference point 34 is defined, for example, by a predefined screw 45, using which an end stop 44 is fastened on the associated container runway 41; 42. The point in time at which the reference position is to be captured can be signaled, for example, in that the hand is held stationary at the reference position for a short time span, for example, two seconds. However, it is also possible that the worker actuates a button or a virtual switch surface using the other hand. A virtual switch surface is projected by the image projection device onto the work surface 12, wherein the actuation thereof is recognized using the first position determination device.

After the capture of the reference position, the worker guides the read device to the first data carrier 31, so that the first data thereof are read out. The worker then guides the read device to the second data carrier 32, so that the second data thereof are read out. The reference position, the first data, and the second data are stored, preferably in the control device. The above steps are repeated after corresponding prompting by the control device for all container receptacle devices 30. As soon as all container devices have been captured, the worker actuates a switch surface, which is overlaid on the display screen, for example, which is provided with a touch-sensitive surface. The mentioned configuration program is thereupon ended.

The sequence of the method steps during the configuration is not important. For example, it is also conceivable that firstly all reference positions are input, wherein subsequently all first data are input, wherein subsequently all second data are input. In this procedure, preferably all container receptacle devices are processed in the same sequence in the three passes.

LIST OF REFERENCE NUMERALS 10 assembly workstation
11 framework
12 work surface
13 light
14 display screen
15 vertical reference plane
16 positioning foot
17 control device
18 read device
19 position of the worker
20 image projection device
21 first position determination device
22 second position determination device
23 tool (screwdriver)
30 container receptacle device
31 first data carrier
32 second data carrier
33 material container
34 reference point
40 holding profile
41 first container runway
42 second container runway
43 spacing of the container runways
44 end stop
45 screw
46 projection surface

What is claimed is:

1. A method for configuring an assembly workstation, the assembly workstation having multiple container receptacle devices configured to receive at least one associated material container, each of the multiple container receptacle devices having a first data carrier, the at least one associated material container having a second data carrier, the assembly workstation having a first position determination device configured to ascertain a position of one of (i) a hand of a worker and (ii) a marking on the hand, the first position determination device being connected to a control device, the method comprising:
   capturing, using the first position determination device, a reference position corresponding to a reference point on a container receptacle device that is touched by the hand of the worker;
   reading out first data from the first data carrier associated with the reference point;
   reading out second data from the second data carrier associated with the reference point; and
   storing the reference position, the first data, and the second data.

2. The method according to claim 1 further comprising:
   carrying out the steps of capturing, reading out the first data, reading out the second data, and storing for all container receptacle devices in which the at least one associated material container is received.

3. The method according to claim 1, the storing comprising: storing the reference position, the first data, and the second data in a common data set such that the reference position, the first data, and the second data are analyzed together.

4. An assembly workstation comprising:
   multiple container receptacle devices configured to receive at least one associated material container, each of the multiple container receptacle devices having a first data carrier, the at least one associated material container having a second data carrier;
   a control device connectable to a read device configured to read data out from the first data carrier and the second data carrier; and
   a first position determination device configured to ascertain one of (i) a position of a hand of a worker and (ii) a marking on the hand, the first position determination device being connected to the control device,
   wherein the control device is configured to (i) capture, using the first position determination device, a reference position corresponding to a reference point on a container receptacle device of the multiple container receptacle devices that is touched by the hand of the worker, (ii) read out, using the read device, first data from the first data carrier associated with the reference point, (iii) read out, using the read device, second data from the second data carrier associated with the reference point, and (iv) store, correlated with one another in a common data set, the reference position, the first data, and the second data.

5. The assembly workstation according to claim 4, wherein:
   at least some of the multiple container receptacle devices have a first container runway and a second container runway arranged in parallel to one another, a spacing between the first container runway and the second container runway being adjustable; and at least one of the first data carrier and the second data carrier store an item of information from which the spacing between the first container runway and the second container runway is derivable.

6. The assembly workstation according to claim 5, wherein the first container runway and the second container runway of each of the at least some of the multiple container receptacle devices are arranged in parallel to a vertical reference plane.

7. The assembly workstation according to claim 5 further comprising:
   at least one image projection device; and
   a projection surface for an image of the image projection device arranged on an end face, which faces toward the worker, of the first container runway.

8. The assembly workstation according to claim 7, the control device being further configured to:
   project, using the at least one image projection device, a predefined image onto the projection surface; and
   ascertain, using a stored reference position associated with the projection surface, and the first data and the second data, a distorted image, which is transmitted to the image projection device, proceeding from the predefined image.

9. The assembly workstation according to claim 5, wherein the first data carrier is arranged on an end face of the second container runway facing toward the worker.

10. The assembly workstation according to claim 5 further comprising:
    at least one tool; and
    a second position determination device configured to ascertain at least one of a position and a rotational orientation of the at least one tool,
    wherein the first position determination device and the second position determination device are designed differently from one another.

11. The assembly workstation according to claim 5, the control device being further configured to:
    ascertain, using the first position determination device and the reference position, the first data, and the second data, whether the worker has reached with his hand into the at least one associated material container.

* * * * *